United States Patent [19]

Grover et al.

[11] Patent Number: 4,577,496
[45] Date of Patent: Mar. 25, 1986

[54] TRANSDUCER AND HOLDER THEREFOR FOR ULTRASONIC ACOUSTIC TACHOMETER

[75] Inventors: Donald D. Grover; Glenn A. Kaufman, both of Kenosha, Wis.

[73] Assignee: Snap-on Tools Corporation, Kenosha, Wis.

[21] Appl. No.: 696,930

[22] Filed: Jan. 31, 1985

[51] Int. Cl.⁴ .............................................. G01M 15/00
[52] U.S. Cl. .................................. 73/119 A; 73/861.18
[58] Field of Search ................ 73/119 A, 861.18, 587

[56] References Cited

U.S. PATENT DOCUMENTS

| | | |
|---|---|---|
| 3,344,663 | 10/1967 | Dreisin et al. . |
| 3,580,092 | 5/1971 | Scarpa . |
| 3,731,527 | 5/1973 | Weaver . |
| 3,783,681 | 1/1974 | Hirt et al. . |
| 3,958,458 | 5/1976 | Foreman et al. . |
| 4,109,517 | 8/1978 | Dyballa et al. . |
| 4,187,720 | 2/1980 | Baker . |
| 4,192,179 | 3/1980 | Yelke . |
| 4,295,364 | 10/1981 | Dooley et al. ............... 73/119 A |
| 4,319,481 | 3/1982 | Yelke . |
| 4,391,147 | 7/1983 | Krempl et al. . |
| 4,425,800 | 1/1984 | Claassen et al. . |
| 4,429,570 | 2/1984 | Tinder . |
| 4,444,049 | 4/1984 | Hitchcock . |
| 4,454,767 | 6/1984 | Shinkai et al. . |
| 4,459,544 | 7/1984 | Makita . |

FOREIGN PATENT DOCUMENTS 723204  3/1980  U.S.S.R. ............................ 73/119 A

Primary Examiner—Howard A. Birmiel
Attorney, Agent, or Firm—Emrich & Dithmar

[57] ABSTRACT

An engine timing apparatus includes a piezoelectric transducer and a device for mechanically coupling it to a fuel injector body of the engine. A 6-inch clamping-type pliers is clamped to the injector body. A metal housing is fastened to the pliers at the jaw pivot, the housing having a cylindrical side wall and a circular bottom wall in positive contact with the pliers. The transducer is supported in a recess in a rubber sleeve in the housing and cooperates with the housing to define a resonant chamber at substantially 40 Khz. The dimensions of the pliers are such that the ultrasonic acoustic emissions of the injector body induce in the pliers a standing wave at substantially 40 Khz or a harmonic thereof, the jaw pivot being disposed substantially at an antinode, or point of maximum displacement, of the standing wave. The housing above the transducer is filled with an acoustically insulating foam and covered with a plastic cap.

20 Claims, 3 Drawing Figures

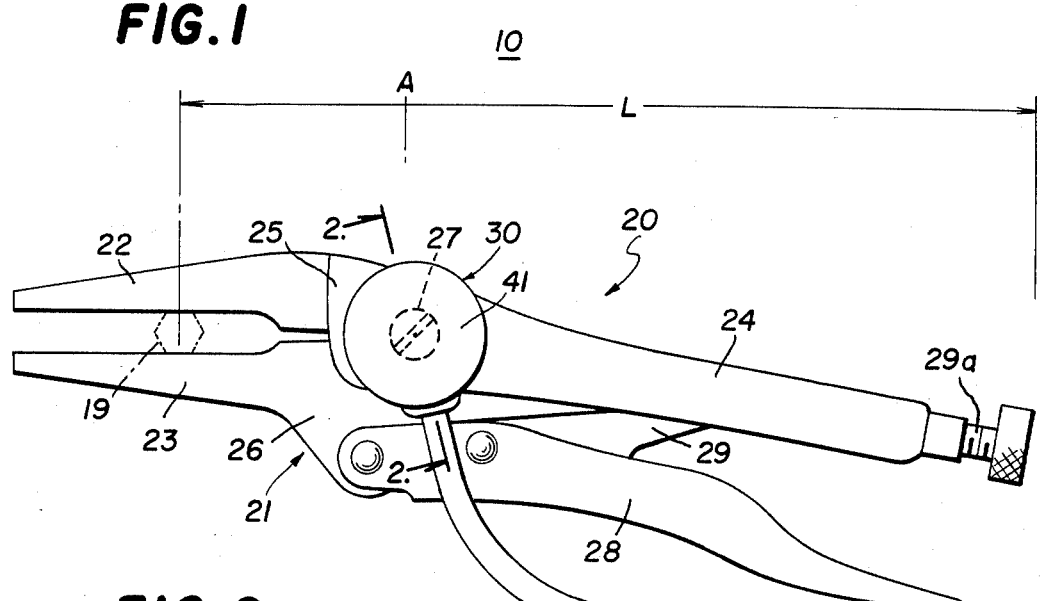
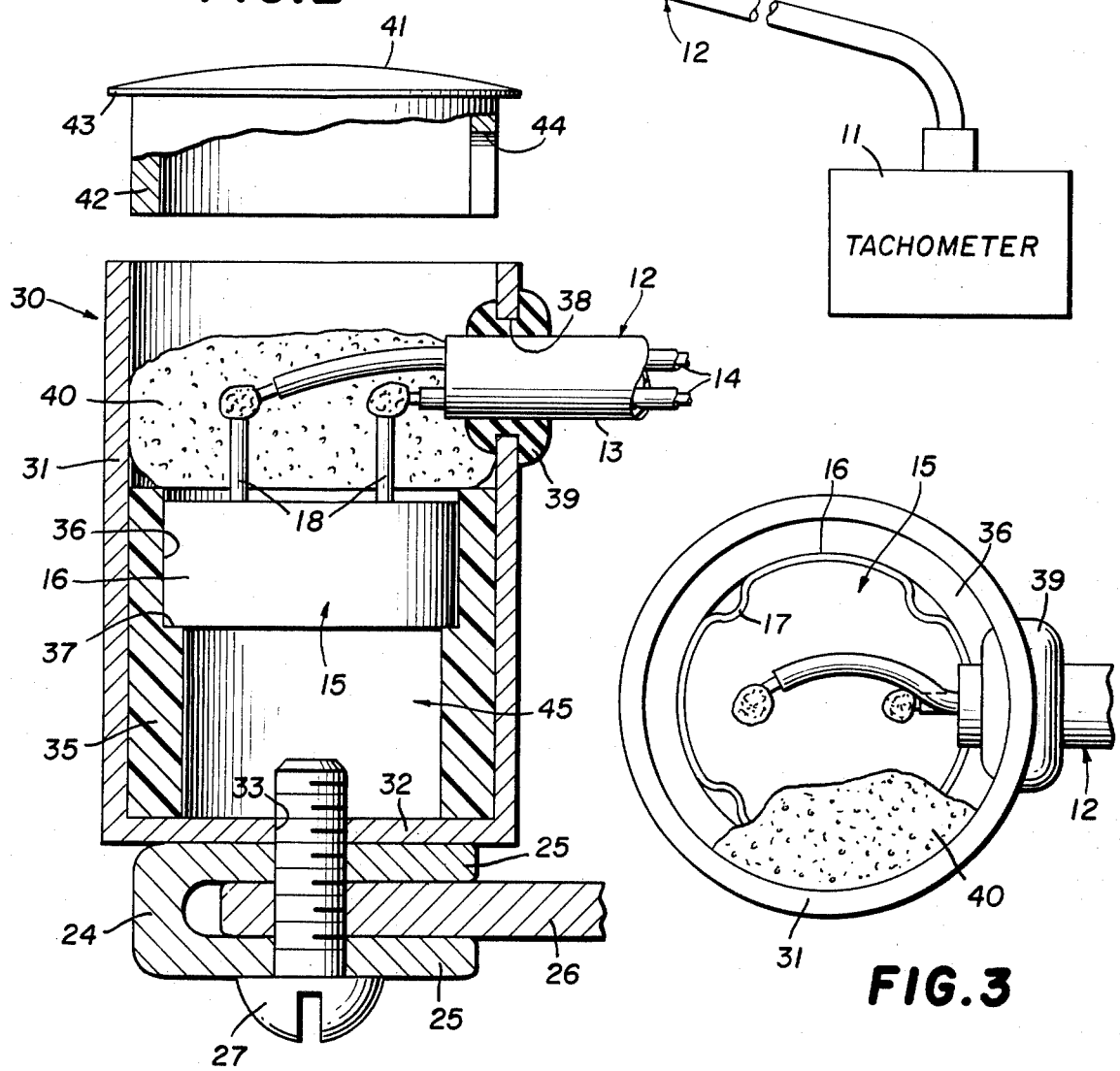

TRANSDUCER AND HOLDER THEREFOR FOR ULTRASONIC ACOUSTIC TACHOMETER

BACKGROUND OF THE INVENTION

This invention relates to apparatus for mechanically coupling a transducer to a source of ultrasonic acoustic emissions, i.e., acoustic emissions at frequencies above the range of human hearing. In particular, the invention relates to apparatus for holding a transducer to sense the ultrasonic acoustic emissions of fluid flow through an orifice, such as in the fuel injector assembly of an internal combustion engine, for tachometry purposes or the like.

It is desirable to determine the timing of the injection of fuel into internal combustion engines, such as diesel engines, for purposes of analyzing engine performance or the like. It is known to determine this timing by sensing the characteristic ultrasonic acoustic emissions caused by the injection of the fuel into the cylinder, which ultrasonic acoustic emissions typically have a predominant frequency of approximately 40 Khz. For example, U.S. Pat. No. 4,444,049, discloses the use of a pliers-type clamp for clamping onto the fuel delivery nozzle, the clamp carrying a directional microphone for sensing the high frequency ultrasonic acoustic emissions caused by the fuel injection. However, the microphone has a fairly broad-band response and is susceptible to picking up ambient and background sounds and emissions, as well as the desired 40 Khz fuel injection ultrasonic acoustic emissions. Thus, the device is inherently noisy, resulting in inaccurate measurements. Additionally, the microphone is air coupled to the source of emissions, resulting in a significant loss of amplitude.

It is also known to clamp other types of transducers to the fuel injector assembly, such as acoustical magnetic transducers, as disclosed in U.S. Pat. No. 4,187,720 or piezoelectric transducers, as disclosed in U.S. Pat. No. 4,319,481. But, again, these devices are not very selective and, therefore, tend to be rather susceptible to acoustic noise. More specifically, the fuel injection apparatus and related parts of the internal combustion engine emit a number of different frequency acoustic emissions and vibrations, in addition to the 40 Khz acoustic emission which is sought to be detected. These extraneous emissions confuse the output signals from the prior art sensing devices.

SUMMARY OF THE INVENTION

It is a general object of the invention to provide an improved transducer and holding apparatus therefor which avoids the disadvantages of prior devices, while affording additional structural and operating advantages.

An important object of the invention is the provision of a transducer holding apparatus which has a relatively high signal-to-noise ratio.

In connection with the foregoing objects, another object of the invention is the provision of a transducer holding apparatus which can be quickly and easily applied to a source of acoustic emissions, and yet which provides a secure mechanical coupling of the transducer thereto.

It is another object of the invention to provide a transducer holding apparatus of the type set forth, which is of simple and economical construction, but provides a high degree of frequency selectivly.

Yet another object of the invention is the provision of a transducer holding apparatus of the type set forth, which is substantially tuned to the frequency of the acoustic emissions to be detected.

In connection with the foregoing object, still another object of the invention is the provision of a transducer holding apparatus of the type set forth, which acts as a fixed free bar to establish a standing wave pattern at the frequency range of interest or a harmonic thereof.

These and other objects of the invention are attained by providing apparatus for holding a transducer to sense ultrasonic acoustic emissions of a predetermined frequency caused by fluid flow through an orifice in an injector assembly, the apparatus comprising: manually operable clamp means adapted to be clamped to the injector assembly so that the ultrasonic acoustic emissions thereof are transmitted to the clamp means, the clamp means having a length such that the ultrasonic acoustic emissions transmitted thereto establish therein standing waves substantially at the predetermined frequency or a harmonic thereof, and means mounting the transducer on the clamp means substantially at a region of maximum displacement in said standing wave for generating electrical signals in response thereto.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a side elevational view of an ultrasonic tachometer including a transducer and holding apparatus therefor constructed in accordance with and embodying the features of the present invention;

FIG. 2 is an enlarged, fragmentary and partially exploded view in vertical section taken along the line 2—2 in FIG. 1; and FIG. 3 is a top plan view of the apparatus of FIG. 2, with the cover removed.

DESCRIPTION OF THE PREFERRED EMBODIMENT

Referring to drawings, there is illustrated an ultrasonic tachometry assembly, generally designated by the numeral 10, which includes a tachometer 11 incorporating suitable signal processing means. The tachometer 11 receives signals over a shielded cable 12, comprising a shielding material 13 surrounding a pair of insulated conductors 14. The other ends of the conductors 14 are connected, as by soldering, respectively to the terminals 18 of a piezoelectric transducer 15. The transducer 15 has an external, generally cylindrical housing 16 provided with a plurality of radially inwardly extending gripping bosses 17 for fixedly securing the housing 16 to the material of the transducer 15. In use, the transducer 15 is mechanically coupled, by means to be described below, to a fuel injector body 19 of an internal combustion engine, such as a diesel engine, or to some other nearby element mechanically connected to the injector body 19.

The transducer 15 is carried by a transducer holding assembly 20, constructed in accordance with and embodying the features of the present invention. The transducer holding assembly 20 includes a pliers-type clamp 21, such as a lever-type combination pliers and clamp of the type sold by Petersen Mfg. Co. under the trademark "VISE-GRIP". The clamp 21 includes a pair of needle-nose jaws 22 and 23. The jaw 22 is integral with an elongated handle 24 having a pair of parallel clevis plates 25, between which is received a pivot portion 26 of the jaw 23. A pivot pin, such as a screw 27, is received through aligned openings in the pivot portion 26 and the clevis plates 25 for accommodating pivotal movement of the jaws 22 and 23 relative to each other about the axis of the screw 27. Pivotally coupled to the pivot portion 26 is an elongated handle 28, to which is also pivotally connected a toggle link 29, the other end of which is disposed between the clevis plates 25 of the handle 24 for sliding movement longitudinally thereof. An adjustment screw 29a is threadedly engaged with the distal end of the handle 24 for bearing engagement with the distal end of the toggle link 29 for adjustment of the space between the jaws 22 and 23 when they are in their closed position. A helical compression bias spring (not shown) interconnects the handle 24 and the pivot portion 26 for resiliently biasing the pliers-type clamp 21 to an open position, and there may also be provided a release lever (not shown), all in a known manner.

The transducer holding assembly 20 also includes a housing 30, generally in the shape of open-top metal can having a cylindrical side wall 31, closed at the lower end thereof by an integral circular bottom wall 32. The bottom wall 32 has an internally threaded opening 33 therein centrally thereof for threadedly receiving therein the pivot screw 27, securely to mount the housing 30 on the clamp 21 in a mounting position, illustrated in FIGS. 1 and 2, with the circular bottom wall 32 in positive contact with the adjacent one of the clevis plates 25. Disposed within the housing 30 coaxially therewith is a cylindrical support 35, preferably formed of a flexible, resilient, acoustically insulating material, such as a soft rubber material. The support 35 has a reduced inner diameter portion 36 at the upper end thereof which defines at its lower end an annular shoulder 37. Formed in the cylindrical side wall 31 above the support 35 is a circular opening 38, in which is fitted a grommet 39 for receiving therethrough the shielded cable 12.

In use, the transducer 15 is frictionally seated in the support 35 upon the shoulder 37, as illustrated in FIGS. 2 and 3. After the conductors 14 have been connected to the transducer terminals 18, the transducer 15 and the upper end of the support 35 are covered with an acoustically insulating material 40, such as a suitable acoustic foam or soft rubber material. The open end of the housing 30 is closed by a circular cap 41 having a depending cylindrical side wall 42, which is dimensioned to be press-fitted telescopically within the upper end of the housing 30. The cap 41 has a portion which extends radially outwardly beyond the cylindrical wall 42 around the circumference thereof to define an annular flange 43, which engages the upper end of the cylindrical side wall 31 to limit the depth of insertion of the cylindrical wall 42 therein. Formed in the side of the cylindrical wall 42 is a generally inverted U-shaped opening or slot 44 for accommodating the cable 12 and the grommet 39. It can be seen that the circular bottom wall 32, the support 35 and the transducer 15 cooperate to define a cylindrical cavity, which is designed to be a resonant chamber 45 at a predetermined frequency, as will be explained more fully below.

In operation, the jaws 22 and 23 of the clamp 21 are clamped to a fuel injector body 19 of the internal combustion engine. The adjustability of the pliers-type clamp 21 permits the clamp to be securely fastened to the injector body 19 so that a full spectrum of ultrasonic acoustic emissions of the injector body 19 are transmitted to the clamp 21. However, it will be appreciated that it is only the characteristic 40 Khz emissions of the fuel flowing through the orifice of the injector body 19 that is of interest, for the purposes of determining the timing of the fuel injections. Thus, it is a fundamental aspect of the present invention that the transducer 15 and the transducer holder assembly 20 are designed to selectively respond to these 40 Khz emissions or harmonics thereof, and to be substantially non-responsive to emissions of other frequencies.

More particularly, the clamp 21 is arranged to respond to ultrasonic acoustic emissions mechanically coupled thereto, substantially as a fixed-free bar, i.e., as a bar fixed adjacent to only one end. Acoustic emissions transmitted to such a bar will establish therein standing wave patterns which are a function of the length of the bar and the frequencies of the emissions transmitted thereto. Such a standing wave will be established at the 40 Khz frequency transmitted to the clamp 21. It is an important aspect of the present invention that the housing 30 be positioned at one of the 40 Khz standing wave antinodes, i.e., the points of maximum displacement of the standing wave, induced in the clamp 21, so as to maximize the energy transferred to the resonant chamber 45 and to the transducer 15, thereby maximizing the signal-to-noise ratio.

By experimentally testing, with a suitable pickup device, the response of different size clamping-type pliers to the ultrasonic acoustic emissions from an injector body 19, the locations of the nodes and antinodes of the standing waves in the clamp 21 for a narrow band of frequencies, centered at 40 Khz, can be determined. It has, thus, been experimentally determined that the optimum response in commonly available standard-sized pliers, is provided by a 6-inch pliers. This is so because that size clamp 21 has a length L which approximates one wave length of a 40 Khz wave in the material (typically steel) of the clamp 21, so as to provide the maximum amplitude signal at the 40 Khz standing wave antinodes. Furthermore, that size pliers produces an antinode A approximately at the location of the pivot screw 27, which is a convenient place to mount the housing 30. It will be appreciated that a user could mount the clamp 21 so that the injector body 19 falls anywhere along the length of the jaws 22 and 23. Thus, in order to ensure optimum response, an indicating mark (not shown) will preferably be provided on the jaws 22 and 23 to indicate to the user the point at which the clamp should be applied to the injector body 19.

It will be appreciated that this critical placement of the housing 30 at an antinode of the 40 Khz standing wave provides a desirable selectivity of the frequency response of the transducer holding assembly 20. More specifically, because of this placement of the housing 30, the system will respond more strongly to the 40 Khz ultrasonic acoustic emissions than to other frequency emissions which are coupled to the clamp 21. Thus, the predominant ultrasonic acoustic emission transmitted to the resonant chamber 45 and to the transducer 15 will be the 40 Khz emission.

An additional degree of selectivity is provided by the design of the housing 30. More specifically, the housing 30 and the mounting position of the transducer 15 therein are selected so that the resonant chamber 45 will be resonant substantially at 40 Khz or a harmonic thereof. Various dimensions of the resonant chamber 45 may provide the desired resonance. For a given diameter housing 30, the axial position of the transducer 15 therein which will produce the maximum amplitude response to a 40 Khz ultrasonic acoustic emission can be experimentally determined. By coupling the clamp 21 to the transducer 15 through the resonant chamber 45, the system effectively filters out other ultrasonic acoustic emissions, and renders the transducer 15 responsive fundamentally only to the ultrasonic acoustic emissions in the resonant range of the chamber 45, which is preferably arranged to be a band no greater than 2 Khz wide centered at 40 Khz.

A third degree of selectivity is afforded by the design of the piezoelectric transducer 15, which is dimensioned to be responsive only to a narrow band of frequencies centered at 40 Khz. The response range is designed to be less than about 8 Khz in width. It is important that the response band would be no wider than this, since there is a significant vibration in most internal combustion engines at about 18 Khz, which vibration has a relatively strong second harmonic. Selecting a response band of the transducer 15 to have a lower cut-off above 36 Khz will assist in effectively filtering out this second harmonic.

From the foregoing, it can be seen that the transducer holding assembly 20 is selectively responsive to a narrow band of frequencies centered at 40 Khz, the selectivity being afforded by the dimensions of the clamp 21 and the placement of the housing 30 thereon, by the tuned resonance of the chamber 45, and by the response bandwidth of the transducer 15. This frequency selectivity not only effectively filters out ambient acoustic noise, but also effectively eliminates response to significant vibrations or acoustic emissions in the associated engine other than the 40 Khz fuel injection emissions of interest.

In a constructional model of the present invention, the housing 30 may be formed of a suitable material such as metal, the clamp 21 is formed of steel and the cap 41 is formed of a suitable plastic. The transducer 15 may be a ceramic ultrasonic transducer of the type sold by Shigoto Far East, Ltd., under the designation SCM-401. Such a transducer has a bandwidth of approximately 5 Khz centered at 40 Khz, plus or minus 1 Khz. While the present invention has been designed specifically for sensing of 40 Khz ultrasonic acoustic emissions, it will be appreciated that the principles of the present invention could be applied to the sensing of acoustic emissions of any predetermined frequency.

From the foregoing, it can be seen that there has been provided an improved transducer and holder apparatus therefor which is of simple and economical construction and application, which provides a secure mechanical coupling of the transducer to the associated source of ultrasonic acoustic emissions, and which provides a high degree of selectivity of the band width of ultrasonic acoustic emissions to which the transducer will be responsive so as to maximize signal-to-noise ratio.

We claim:

1. Apparatus for holding a transducer to sense ultrasonic acoustic emissions of a predetermined frequency caused by fluid flow through an orifice in a fuel injector body, said apparatus comprising: manually operable clamp means adapted to be clamped to the injector body so that the ultrasonic acoustic emissions thereof are transmitted to said clamp means, said clamp means having a length such that the ultrasonic acoustic emissions transmitted thereto establish therein standing waves substantially at the predetermined frequency or a harmonic thereof; and means mounting the transducer on said clamp means substantially at a region of maximum displacement in said standing wave for generating electrical signals in response thereto.

2. The apparatus of claim 1, wherein said mounting means includes means mechanically coupling the transducer to said clamp means.

3. The apparatus of claim 2, wherein said clamp means comprises a clamping-type pliers having a pair of jaws pivotally movable with respect to each other about a predetermined axis, said mounting means being disposed substantially at said axis.

4. The apparatus of claim 1, wherein the transducer has a response bandwidth of approximately 5 Khz, centered at substantially 40 Khz.

5. The apparatus of claim 1, wherein the predetermined frequency is substantially 40 Khz.

6. The apparatus of claim 1, wherein said clamp means comprises a clamping-type pliers approximately 6 inches in length.

7. The apparatus of claim 1, wherein the transducer is a piezoelectric transducer.

8. Apparatus for holding a transducer to sense ultrasonic acoustic emissions of a predetermined frequency caused by fluid flow through an orifice in a fuel injector body, said apparatus comprising: manually operable clamp means adapted to be clamped to the injector body so that the ultrasonic acoustic emissions thereof are transmitted to said clamp means, and means mounting the transducer on said clamp means, said mounting means cooperating with the transducer to define a resonant chamber having a natural resonant frequency substantially equal to the predetermined frequency or a harmonic thereof, the ultrasonic acoustic emissions transmitted to the clamp means being transmitted to the transducer through said resonant chamber for generating electrical signals in response to the emissions.

9. The apparatus of claim 8, wherein the predetermined frequency is substantially 40 Khz.

10. The apparatus of claim 8, wherein said clamp means comprises a clamping-type pliers.

11. The apparatus of claim 10, wherein said pliers includes a pair of jaws mounted for pivotal movement about an axis, said mounting means being disposed substantially at said axis.

12. The apparatus of claim 8, wherein said mounting means includes a cylindrical housing closed at one end by a circular end wall disposed in positive contact with said clamp means, and means supporting the transducer within said housing.

13. The apparatus of claim 12, wherein said support means comprises a sleeve of acoustically insulating material.

14. The apparatus of claim 12, and further including a body of acoustically insulating material covering the transducer on the side thereof opposite said cavity.

15. The apparatus of claim 12, and further including cap means closing the open end of said housing.

16. Apparatus for holding a transducer to sense ultrasonic acoustic emissions of a predetermined frequency caused by fluid flow through an orifice in a fuel injector body, said apparatus comprising: manually operable clamp means adapted to be clamped to the injector body so that the ultrasonic acoustic emissions thereof are transmitted to said clamp means, said clamp means having a length such that the ultrasonic acoustic emissions transmitted thereto establish therein standing waves substantially at the predetermined frequency or a harmonic thereof, and means mounting the transducer on said clamp means substantially at a region of maximum displacement in said standing wave, said mounting means cooperating with said clamp means and with the transducer to define a resonant chamber having a natural resonant frequency substantially equal to the predetermined frequency or a harmonic thereof, the ultrasonic acoustic emissions transmitted to the clamp means being transmitted to the transducer through said resonant chamber for generating electrical signals in response to the emissions.

17. The apparatus of claim 16, wherein said clamp means comprises a clamping-type pliers.

18. The apparatus of claim 16, wherein the transducer has a response bandwidth of approximately 5 Khz centered at substantially 40 Khz.

19. The apparatus of claim 16, wherein the predetermined frequency is substantially 40 Khz, said clamp means having a length of approximately 6 inches.

20. The apparatus of claim 16, wherein said mounting means includes a cylindrical housing closed at one end thereof by a circular end wall disposed in positive contact with said clamp means.

* * * * *